Figures 1, 2:
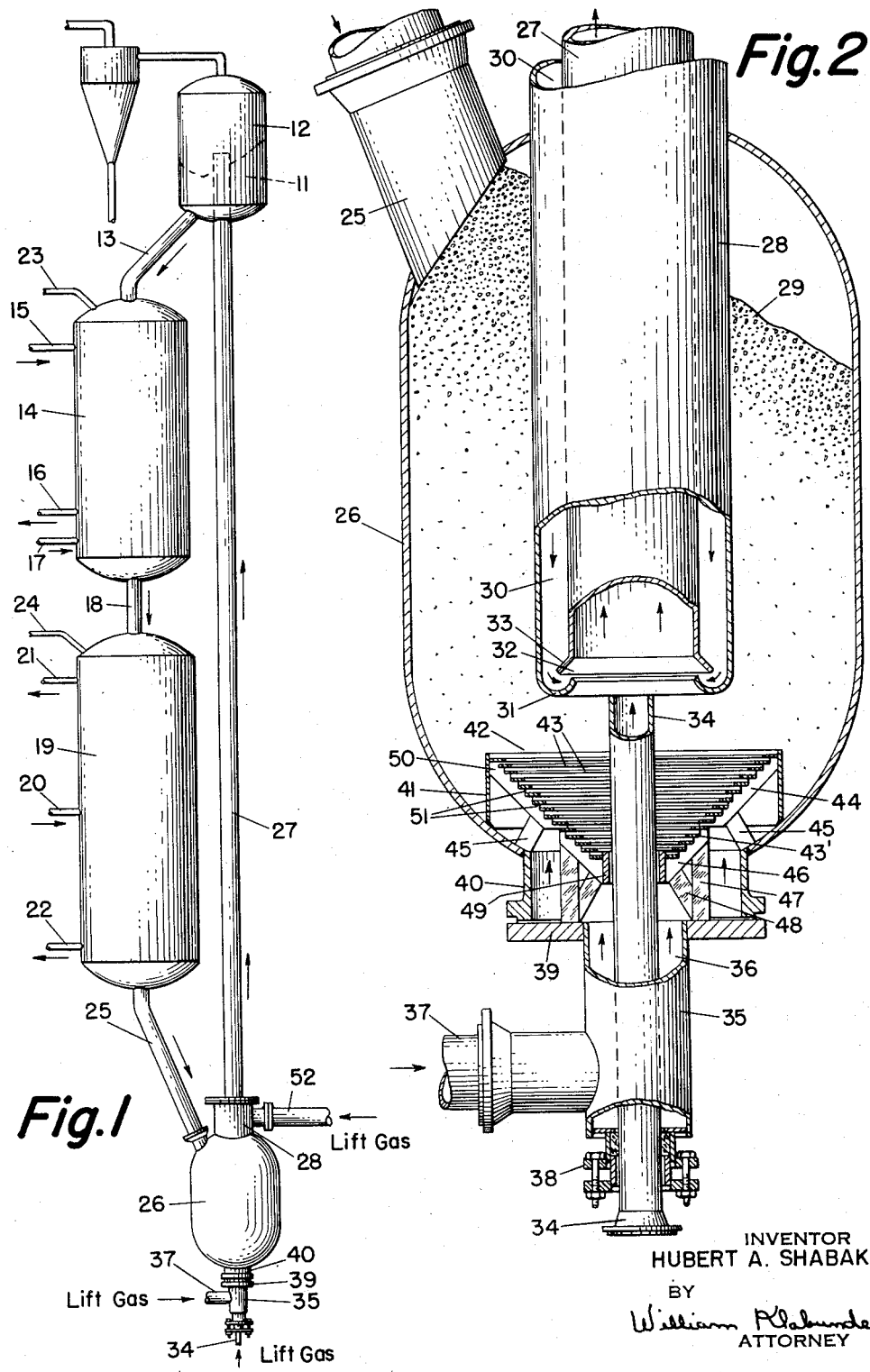

Dec. 15, 1953        H. A. SHABAKER        2,662,796
APPARATUS FOR ELEVATING GRANULAR MATERIAL
Filed July 20, 1950

INVENTOR
HUBERT A. SHABAKER
BY
William Klabunde
ATTORNEY

Patented Dec. 15, 1953

2,662,796

UNITED STATES PATENT OFFICE 2,662,796

APPARATUS FOR ELEVATING GRANULAR MATERIAL

Hubert A. Shabaker, Media, Pa., assignor to Houdry Process Corporation, Wilmington, Del., a corporation of Delaware Application July 20, 1950, Serial No. 174,993

14 Claims. (Cl. 302—53)

This invention relates to apparatus for elevating granular material by means of a gaseous medium, and is particularly directed to gas lift systems adapted for use in the chemical processing and petroleum refining industries wherein granular contact material, such as catalyst, is continuously circulated through one or more treating zones, the contact material flowing downwardly through the zones and then being elevated for reuse by means of a gas lift.

The invention is an improvement in apparatus of the type disclosed in the application of Chalmer G. Kirkbride, filed concurrently herewith.

A typical system to which the present invention may be applied is illustrated and described in an article entitled "Houdriflow: New Design in Catalytic Cracking," appearing at page 78 of the January 13, 1949, issue of the "Oil and Gas Journal." The article discloses, briefly, a catalytic cracking system for the refining of hydrocarbons comprising superimposed reactor and regenerator vessels connected to form a downflow path through which catalyst in the form of beads or pellets is passed by gravity flow. The catalyst is supplied to the downflow path from an upper lift hopper disposed at an elevation substantially above the uppermost vessel, and is withdrawn from the lowermost vessel and passed downwardly into a lower lift hopper. In the connecting conduits of the downflow path the catalyst gravitates as a compact moving column, and within the vessel or vessels which form contact zones for engagement of the catalyst with gaseous reactants, the catalyst gravitates in the form of a compact non-turbulent moving bed.

The lower lift hopper provides an introduction chamber, or engaging zone, wherein the catalyst may be engaged by the gaseous lift medium and introduced therewith into the lower end of a lift pipe, which extends from a low point within the introduction chamber upwardly to a point within the upper lift hopper.

In introducing contact solid into the lift inlet, turbulence thereof with its attendant physical inter-particle contact tends to cause attrition of the particles, to a degree dependent upon the amount of turbulence, thus producing particles, and even powder, of smaller size than desired for effective and efficient operation of the circulation system. To maintain desired operation of the system, the smaller-size attrited solids are rejected from it. Attrition, therefore, represents a direct loss of contact mass to the operation, and is an important factor in the overall economics of that operation. Such attrition, caused by inter-particle collision, is enhanced by collision of particles of solid with metal surfaces, such as the walls and end of the lift. This latter tendency is ordinarily greater at or adjacent the lift inlet, and causes, in addition to loss of contact solid, erosion of the metal parts affected.

The present invention is directed to improved apparatus for introducing contact solid into a pneumatic lift in which the movement of the particles effecting attrition and erosion may be kept within low and economical limits.

In accordance with the invention, it is proposed to pass the granular material downwardly around the lower end portion of the lift pipe, inwardly under the lower end toward the projected axis thereof, and then upwardly into the mouth of the lift as a broad non-turbulent dense stream of high particle concentration moving at relatively low velocity. Upon entering the lift pipe the dense stream is engaged by additional streams of lift gas directed upwardly therein and introduced at points adjacent the lower end of the lift pipe. The additional lift gas so introduced is provided in quantities sufficient to elevate the granular material through the remaining portion of the lift pipe in a stream of substantially lower particle concentration and at a higher velocity. The lift gas which is introduced from the latter streams adjacent the lift inlet constitutes the primary lift gas since it is of major amount and provides the main lifting or carrier effect within the lift. The lift gas introduced directly into the moving bed at a distance from the lift inlet constitutes the secondary lift gas, it being of minor amount, but nevertheless sufficient in quantity to feed the granular material into the lift pipe at the desired flow rate. The secondary lift gas is introduced into the moving bed in such a manner that by the time it reaches the lift inlet the gas will have become dispersed throughout a flow area of the bed sufficient to assure the formation of a dense phase, low velocity stream of substantial depth below the end of the lift pipe. Obviously, the nearer the point of secondary gas introduction is to the lift inlet the broader the cross-section flow area of the secondary gas inlet must be. In a preferred embodiment of the invention, though not necessarily limited thereto, secondary gas is introduced into the moving bed from the lower region of the introduction chamber below the lift inlet, the gas being introduced through a screen or grid of substantially greater horizontal flow area than the available inlet area of the lift pipe, so that there is provided a flow of gas from the region below the lift pipe which carries the granular material as a dense mass of relatively high particle concentration upwardly as a broad slow moving stream which converges toward the mouth of the lift pipe.

In accordance with the invention, and particularly as applied to those embodiments thereof in which secondary gas is introduced from an inlet situated beneath the lower end of the lift pipe, it is further proposed to provide a means to prevent clogging of the secondary gas inlet by solid particles which settle thereon during periods of interrupted gas flow, and to enable the secondary gas inlet to be readily cleared of the accumulation of granular material when gas flow is again initiated.

For a fuller understanding of the invention reference may be had to the accompanying drawing forming a part of this application, in which:

Fig. 1 diagrammatically illustrates a hydrocarbon conversion system, including a gas lift for circulating granular material, to which the method and apparatus of the invention may be applied; and Fig. 2 is an enlarged sectional elevation of the lower lift hopper, or introduction chamber, illustrating the method and apparatus by which the granular material is engaged by the lift gas and conveyed therewith upwardly into and through the lift pipe.

Referring to the embodiment illustrated in the drawing, Fig. 1 shows a typical hydrocarbon conversion system in which contact material, such as catalyst in the form of granules, pellets, etc., flows downwardly by force of gravity as a compact moving bed 11 in the lower region of an upper lift hopper 12, the latter comprising the disengaging zone referred to hereinafter. The catalyst is continuously withdrawn from upper lift hopper 12 as a compact moving column through a seal leg 13 and is passed into the upper end of a reaction chamber 14 wherein in known manner, the catalyst gravitates as a compact moving bed while being contacted with gaseous reactants introduced into the reaction chamber, as through inlet 15, to carry out the desired conversion. The gaseous products of reaction are separated from the catalyst in the lower portion of the chamber 14, the former being withdrawn from the vessel, as through outlet 16, and passed to subsequent treating sections of the system, not shown. The latter, bearing a carbonaceous deposit thereon, is stripped in conventional manner of vaporizable hydrocarbon material by contact with stripping gas introduced in the bottom of the chamber 14, as through inlet 17 and is then withdrawn from the chamber as a compact moving column through seal leg 18.

The stripped, contaminated catalyst is passed through seal leg 18 into the upper end of a regenerator 19, wherein the contaminated material is contacted with a combustion-supporting gas, introduced into the regenerator through inlet line 20, to burn off the carbonaceous deposit. The catalyst gravitates as a compact moving bed through the regenerator 19. Since inlet line 20 is connected to the regenerator at an intermediate level, the flow of gas and solids will be countercurrent in the upper region of the vessel and concurrent in the lower region thereof. The gaseous products of combustion, or flue gas, are withdrawn from the regenerator 19, as by outlet lines 21 and 22, and disposed of in the usual manner. A portion of the flue gas may be employed as a gaseous lift medium for returning the catalyst to the upper lift hopper as will presently be described. Following conventional practice, seal gas may be introduced into the upper region of reactor 14 and regenerator 19 through inlet lines 23 and 24, respectively.

The regenerated catalyst is withdrawn from the bottom of regenerator 19 as a compact moving column through seal leg 25, and is passed into a lower lift hopper 26 which provides an introduction chamber or engaging zone wherein the catalyst is engaged by a lift gas, such as air, steam, etc. or flue gas withdrawn from the regenerator through outlets 21 and 22, and conveyed upwardly through a lift pipe 27 to the upper lift hopper 12.

For a clear illustration of a method and means by which such engagement of lift gas and catalyst may be effected, reference may be made to Fig. 2, which shows an enlarged view of the interior fo the lower lift hopper 26, representing one embodiment of the invention.

In Fig. 2, the lower end of the lift pipe 27 is shown as being surrounded by a radially-spaced concentric sleeve member 28, both extending into and terminating in the lower region of the hopper 26. Catalyst entering the hopper 28 through seal leg 25 forms a compact moving bed 29 which flows by the force of gravity downwardly about the sleeve-encased portion of the lift pipe to the lower region of the lift hopper below the open inlet end of the lift pipe.

Lift gas is supplied to the introduction chamber in a plurality of streams, one of which is introduced around the lower periphery of the lift path in an annular stream discharging upwardly within the mouth of the lift pipe from the annular passage 30 formed between the lift pipe and the sleeve. Such gas is introduced into the annular passage 30 through inlet line 31, shown in Fig. 1. As stated, the gas may comprise flue gas from regenerator outlets 21 and 22.

The lower end of sleeve 28 is turned inwardly and upwardly into the lower end of the lift pipe, as at 31, the respective ends being arranged in overlapping spaced relationship to provide an annular communicating passage 32 between the sleeve passage 30 and the lift pipe 27 whereby the lift gas may be introduced into the latter in an upwardly directed stream, and the catalyst may flow smoothly around the curved lower end 31 of the sleeve. A suitable arrangement for discharging lift gas upwardly within the lift pipe is illustrated in the drawing. The particular embodiment shown provides peripheral gas introduction without having the lift path substantially restricted at the inlet by the turned-up portion 31 of the sleeve. By flaring the lower end of the lift pipe slightly, as at 33, the desired upward discharge of lift gas through inlet 32 may be obtained without extending the turned-up portion 31 any substantial distance radially into the lift path.

A second upwardly directed stream of lift gas is supplied adjacent the lower end of the lift pipe in a stream discharging axially and directly into the lift inlet, without previous contact with the moving bed, by means of inlet conduit 34 extending upwardly through an opening in the lower end of lift hopper 26 and terminating adjacent the lower end of the lift pipe. Conduit 34 is preferably in axial alignment with the lift pipe 27.

The first and second streams of lift gas, above described, constitute the primary lift gas for elevating the catalyst through the lift pipe and comprise the major portion of the total lift gas introduced into the introduction chamber 26.

A third stream of lift gas is introduced directly into the moving bed of catalyst 29 at a distance from the lift inlet in order that the catalyst may be elevated from the lower region of the chamber to a level within the lift pipe where it can be engaged by the primary streams of lift gas discharging upwardly from inlet conduit 34 and from annular inlet 32. The latter stream constitutes the secondary lift gas, also called diffuser gas, and comprises a minor portion of the total lift gas, the amount being sufficient, however, to effect initial lifting of the catalyst into the lower end of the lift pipe. Preferably, though not necessarily, the secondary stream is introduced over a broad area of the moving bed from a point or points below the lift inlet.

The secondary or diffuser gas is introduced into the lower lift hopper 26 through a concentric spaced sleeve member 35 surrounding the external portion of conduit 34, the gas being supplied to the annular space 36 between the conduit and the sleeve from a source, not shown, through inlet line 37. A conventional, fluid-tight slip-joint 38 is provided between the lower end of sleeve 35 and conduit 34. The upper end of sleeve 35 is set in a cover-plate 39 removably attached to a flanged nozzle or connector 40 provided at the bottom of the lift hopper. Within the hopper, and concentrically positioned with respect to the lift axis, is a cylindrical member 41, attached along its lower end to the lower wall of the hopper. The cylindrical member 41 is of substantially greater diameter than the lift pipe 27 and the inlet connector 40, and forms with the latter and with the sleeve 35 a continuous annular passage about the conduit 34 for conveying diffuser gas from inlet line 37 directly into the lower region of the moving bed 29.

The broad circular mouth of the diffuser gas inlet member 41 is provided with a cup-shaped screen or grid member, generally indicated by the numeral 42, surrounding the axial conduit 34 and providing a multiplicity of small or narrow openings so designed or arranged as to prevent the admission of substantial quantities of settled catalyst into the annular diffuser gas passage when, for any reason, the supply of diffuser gas is interrupted.

While the system may be operated with any screen or grid having the general configuration shown in the drawing and provided with openings of a size adapted to exclude from the diffuser gas inlet passage substantially all, or all but the smallest of, the catalyst particles, a particularly suitable grid design is that shown in Fig. 2 of the illustrated embodiment.

The grid 42 comprises a vertically-spaced plurality of horizontal flat rings of progressively decreasing diameter extending downwardly about the axis of the lift pipe from the upper rim of cylindrical inlet member 41. The rings are arranged in two groups 43 and 43', separately supported within the diffuser inlet passage and together forming a concave grid of frusto-conical shape. The rings 43 of the upper group are supported by and attached to struts 44 secured at their upper ends to the upper portion of cylinder 41 and at their lower ends to braces 45 extending upwardly from the bottom wall of the lift hopper. The rings 43' of the lower group are supported by and attached to struts 46 supported at their upper ends by vertical braces 47 extending upwardly from the upper surface of cover-plate 39, and at the lower ends by braces 48 extending inwardly and upwardly from the lower end of braces 47. The lower ends of struts 46 are also attached to a sleeve member 49 closely encircling the conduit 34. The struts 44 and 46 may be of any suitable number, preferably equi-spaced about the circumference of the grid, and they may be provided with ledge portions 50 obtained by stepping or slotting the upper edge of the struts. If desired, the rings 43 and 43' may be segmented instead of continuous, and the ends of each segment may be attached, as by welding, to the sides of the strut members 44 and 46, the strut members in such event being formed with straight upper edges. By reason of the separate supporting arrangements for the two groups of rings 43 and 43', the lower group is removable as a unit with the cover-plate 39 and all the inlet members supported therefrom, thus providing access into the lower end of the lift hopper. The vertical spacing between adjacent flat rings is such that a line from the outer circumference of the lower ring to the inner circumference of the upper ring will make an angle with the horizontal less than the angle of repose of the granular catalytic material. With such arrangement, catalyst settling on the grid when the flow of diffuser gas in interrupted will pile up on the flat surface of each ring until the spaces between rings becomes blocked, without spilling off the outer edge into the diffuser inlet passage. When gas flow is again initiated it may, despite a low discharge velocity, readily clear the annular spaces or gas passages 51 of settled catalyst. Although the flow of diffuser gas through the annular passages of the grid 42 is radially inwardly toward the axis of the lift for a short distance, the overall effect is to produce a broad rising stream of lift gas diffusing upwardly through the region of the moving bed beneath the lift pipe from an extensive area directly below and laterally below the lift inlet.

The quantity of lift gas introduced into the moving bed 29 from the diffuser inlet through grid 42 is preferably such as to produce a rising gas stream of relatively low velocity which, in converging toward the mouth of the lift pipe will engage catalyst from the outer descending portion of the moving bed and convey it as a dense stream of high particle concentration inwardly and upwardly into the mouth of the lift. As the dense phase stream of catalyst enters the lift pipe, it is engaged both centrally and peripherally by streams of primary lift gas directed upwardly within the lift pipe. The effect of such primary gas introduction is to accelerate the movement of catalyst upwardly in the lift pipe, thus transforming the dense, low-velocity catalyst stream into a stream of relatively low particle concentration moving at substantially higher velocity.

In any case, it is contemplated that the secondary gas shall not exceed about 35 percent by volume of the total lift gas.

Lift operation in accordance with the present invention may be illustrated by the following data based on the use of a lift of about 150–200 feet in height and 19 inches in diameter (internal):

Catalyst:
- Particle diameter_____ 0.156 in.
- Particle density_____ 80 lbs./cu.ft.
- Bulk density_____ 50 lbs./cu.ft.

Linear velocity at top of lift_____ 30 ft./sec.
Catalyst circulation rate (tons/hr.)_____ 243.
Total air rate (SCFM) at 120° F_ 7140.
Air at secondary gas inlet (SCFM) _____ 1670.
Catalyst concentration (lbs./cu. ft.):
- In column of solids above diffuser _____ 45–15 approx.
- At top of lift pipe_____ 2.3.

With reference to the concentration of catalyst in the column above the diffuser, it is to be understood that the zone of concentration is of irregular shape, being defined broadly as a hollow truncated cone in which the particle concentration may vary from about 45 lbs./cu. ft. at the base to about 15 lbs./cu. ft. at the top, that is in the region immediately surrounding the lift inlet.

By the apparatus of this invention, it is possible to obtain a smooth uniform flow of catalyst under the lower periphery of the lift path characterized particularly by dense phase movement at low velocity without the creation, while undergoing change of direction, of excessive centrifugal forces by the catalyst particles which would increase the particle to particle pressure, and without the creation of a stratified flow pattern around the lower end of the lift path, comprising zones of different particle concentration and velocity, which would cause frictional contact of the catalyst particles with consequent attrition thereof.

While the invention has been shown in but one form, it will be obvious to those skilled in the art that it is susceptible of modification without departing from the spirit of the invention, and it is desired therefore that no limitations shall be placed thereon except those set forth in the appended claims.

What is claimed is:

1. Apparatus for elevating granular material by means of a gaseous lift medium comprising in combination an elongated lift pipe, an introduction chamber surrounding the lower end of said lift pipe and adapted to contain a compact moving bed of said granular material flowing downwardly around and upwardly into said lift pipe, a sleeve surrounding said lift pipe and forming therewith an annular passage for conducting lift gas into said chamber, said sleeve being turned inwardly and upwardly at its lower end and forming with the lower end of said lift pipe a circumferential inlet adapted to discharge lift gas from said annular passage upwardly into said lift pipe, means for introducing an upwardly directed stream of lift gas centrally into the open end of said lift pipe, and means for introducing lift gas into said moving bed from below said open end of the lift pipe and throughout a wide horizontal area substantially greater than the cross-section area of said lift pipe.

2. Apparatus as defined in claim 1 in which said lift pipe is outwardly flared at its lower end, and in which the turned-up portion of said sleeve forms with said flared portion of the lift pipe a circumferential inlet adapted to discharge lift gas from said annular passage into said lift pipe in a stream directed upwardly and inwardly toward the axis of said lift pipe.

3. Apparatus as defined in claim 1 in which said last-mentioned means for introducing lift gas into said moving bed comprises a cylindrical inlet member of substantially greater diameter than said lift pipe extending upwardly from the bottom of said chamber in axial alinement with said lift pipe to form a confined inlet path, and including a cup-shaped downwardly converging grid extending across the upper end of said inlet member and having a multiplicity of lateral passages in the side portions thereof for discharging lift gas into said moving bed in a direction toward the axis of said lift path.

4. Apparatus as defined in claim 3 in which said cup-shaped grid comprises a plurality of axially aligned flat rings of progressively decreasing diameter horizontally supported within said cylindrical member in vertically spaced relationship, the annular spaces between said rings providing horizontal discharge passages.

5. Apparatus as defined in claim 4 in which the extent of overhang between adjacent flat rings is such that the angle with the horizontal of a line extending from the outer circumference of one flat ring to the inner circumference of the above-adjacent ring is less than the angle of repose of said granular material.

6. Apparatus as defined in claim 3 in which said means for introducing an upwardly directed stream of lift gas centrally into the open end of said lift pipe comprises a conduit passing concentrically through said cylindrical inlet member and said grid and extending upwardly at least to the lowermost level within said confined lift path.

7. In apparatus for introducing granular material into a lift pipe for conveyance therethrough by means of a gaseous lift medium directly introduced therein, including an introduction chamber surrounding the lower end of said lift pipe and adapted to contain a compact moving bed of said granular material gravitating around and beneath the end of the lift pipe, the means for introducing lift gas into said introduction chamber for the purpose of elevating said granular material as a moving column of high particle concentration into said lift pipe which comprises a cylindrical inlet member in the bottom wall of said introduction chamber axially aligned with said lift pipe and having its upper end substantially spaced therefrom, said inlet member being of substantially greater diameter than said lift pipe, and a cup-shaped converging grid extending across the upper end of said inlet member, said grid having a multiplicity of openings and being adapted to introduce into said moving bed a broad stream of gas at relatively low velocity directly below and laterally below the mouth of said lift pipe.

8. Apparatus as defined in claim 7 in which said openings in said grid comprise horizontal passages adapted to discharge said gas radially into the cup-shaped portion of said inlet member.

9. Apparatus as defined in claim 8 in which the ratio of length to height of said horizontal passages is such that granular material settling upon said grid during periods of interrupted gas flow and spreading into said horizontal passages may assume therein its normal angle of repose.

10. Apparatus as defined in claim 8 in which said grid comprises a vertically-spaced series of flat rings of progressively increasing size disposed in horizontal position concentrically within said cylindrical inlet member, said flat rings being arranged in overhanging relationship so that the annular spaces therebetween provide said horizontal passages.

11. Apparatus as defined in claim 10 in which said grid is provided with a central opening to permit the insertion therethrough of a conduit coincident with the axis of said lift pipe.

12. Apparatus for elevating granular material by means of a gaseous lift medium comprising in combination an elongated lift pipe, an introduction chamber surrounding the lower end of said lift pipe and adapted to contain a compact moving bed of said granular material flowing downwardly around and upwardly into said lift pipe, a sleeve surrounding said lift pipe and forming therewith an annular passage for conducting lift gas into said chamber, said sleeve being turned inwardly and upwardly at its lower end and forming with the lower end of said lift pipe a circumferential inlet adapted to discharge lift gas from said annular passage upwardly into said lift pipe, a grid spaced below the lower end of said lift pipe a distance sufficient to cause it normally to be entirely submerged within the granular material flowing downwardly under said lift pipe, said grid extending laterally over an area substantially greater than the area of the inlet to said lift pipe, and means for introducing lift gas beneath said grid for passage therethrough upwardly toward and into said lift pipe.

13. Apparatus as defined in claim 12 in which said grid is provided with openings adapted to permit free passage of lift gas, but arranged to prevent the downward passage therethrough of granular material flowing downwardly as a compact mass.

14. Apparatus as defined in claim 12 including means for conveying a confined stream of lift gas upwardly through said grid and discharging the same directly into the mouth of said lift pipe.

HUBERT A. SHABAKER.

References Cited in the file of this patent

UNITED STATES PATENTS

| Number | Name | Date |
|---|---|---|
| 528,417 | Duckham | Oct. 30, 1894 |
| 1,390,974 | Von Porat | Sept. 13, 1921 |
| 1,416,013 | Gieseler | May 16, 1922 |
| 2,493,911 | Brandt | Jan. 10, 1950 |

FOREIGN PATENTS

| Number | Country | Date |
|---|---|---|
| 180,397 | Great Britain | May 11, 1922 |
| 268,667 | Great Britain | Apr. 7, 1927 |
| 7,075 | Netherlands | Mar. 18, 1922 |